United States Patent [19]

Mori et al.

[11] Patent Number: 5,513,206
[45] Date of Patent: Apr. 30, 1996

[54] APPARATUS FOR PREHEATING AND CHARGING SCRAP MATERIALS

[75] Inventors: Motoharu Mori, Yokohama; Hironobu Yoshida, Urayasu; Ikuo Yamamura, Tokyo; Toru Iura, Fujisawa; Osamu Takeuchi, Mitaka; Masaki Ogushi, Yokohama, all of Japan

[73] Assignee: Ishikawajima-Harima Jukogyo Kabushiki Kaisha, Tokyo, Japan

[21] Appl. No.: 335,691

[22] PCT Filed: Apr. 14, 1994

[86] PCT No.: PCT/JP94/00618

§ 371 Date: Nov. 15, 1994

§ 102(e) Date: Nov. 15, 1994

[87] PCT Pub. No.: WO94/24506

PCT Pub. Date: Oct. 27, 1994

[30] Foreign Application Priority Data

Apr. 15, 1993 [JP] Japan ......................... 5-88804
Sep. 29, 1993 [JP] Japan ......................... 5-242771
Jan. 11, 1994 [JP] Japan ......................... 6-1224

[51] Int. Cl.⁶ ..................................... F27D 13/00
[52] U.S. Cl. ..................... 373/80; 373/81; 373/87
[58] Field of Search .................. 373/79–81, 86–87; 75/10.38; 65/27, 35

[56] References Cited

U.S. PATENT DOCUMENTS 3,163,520 12/1964 Collin et al. ........................ 373/80
3,441,651 4/1969 Viens et al. ......................... 373/80
4,385,918 5/1983 Dunn et al. .......................... 65/27
4,676,742 6/1987 Kozierok et al. .

FOREIGN PATENT DOCUMENTS 509817 3/1952 Belgium .
0001814 5/1979 European Pat. Off. .
0066539 12/1982 European Pat. Off. .
1366791 6/1964 France .
2611876 9/1988 France .
567060 12/1932 Germany .
573416 3/1933 Germany .
646391 5/1937 Germany .
224290 2/1990 Japan .

Primary Examiner—Tu Hoang
Attorney, Agent, or Firm—Oblon, Spivak, McClelland, Maier, & Neustadt

[57] ABSTRACT

An apparatus for preheating and charging scrap material includes a throat section (38) having at one end thereof a material charging inlet (37) connected to a furnace shell (2), the throat section extending laterally and upwardly obliquely, a heat exchanger section (39) connected to the other end of the throat section (38) and extending upwardly, a sealing section (42) above the heat exchanger section (39), a material supply (43) for supplying the scrap material into the sealing section (42), an exhaust duct (53) formed at the heat exchanger section (39) just below the sealing section (42) and connected to an exhaust system (58) and a material delivery device (46) disposed at the other end of the throat section (38) for delivering the scrap material (13) from the heat exchanger section (39) to the material charging inlet (37). The scrap material (13) is substantially continuously charged into the furnace shell (2) while preheated by the high-temperature exhaust gases from the furnace shell (2).

22 Claims, 16 Drawing Sheets 5,513,206

APPARATUS FOR PREHEATING AND CHARGING SCRAP MATERIALS

TECHNICAL FIELD

The present invention relates to an apparatus for preheating scrap or pig iron in the form of cold block (hereinafter referred to as scrap material) and continuously charging the same into a melting furnace.

BACKGROUND ART

In order to melt the scrap material, there have been used electric melting furnaces such as DC or AC arc furnaces or non-electrode type melting furnaces in which the scrap material is charged into a furnace shell preliminarily charged with molten steel and oxygen ($O_2$) and fuel such as oil or coal are fed to the furnace shell to burn the fuel, thereby heating and melting the scrap material.

Conventionally, a furnace roof is opened when scrap material is to be charged into a melting furnace of the type described above.

FIG. 1 schematically illustrates a conventional melting furnace in the form of a DC arc furnace which comprises a furnace shell 2 with a bottom electrode 1 (anode) at its bottom, a furnace roof 3 for selectively opening and closing an upper opening of the furnace shell 2, an upper electrode 4 (cathode) vertically extending through the roof 3 coaxially of the latter, an exhaust duct 5 connected to the roof 3, a roof opening-and-closing device 6 which supports the roof 3 for vertical and pivotal movements of the latter and an electrode raising-and-lowering device 7 mounted on the roof opening-and-closing device 6 for vertically moving the upper electrode 4. The furnace shell 2 is rockably supported by a lower supporting stand 8 through a curved rocker 9. When the furnace shell 2 is tilted in a direction perpendicular to the Figure, molten steel 10 in the furnace shell 2 is poured through a spout (not shown) into a ladle 12 on a carriage 11.

A material preheating device (not shown) installed separately from the furnace shell 2 receives high-temperature exhaust gases from the shell 2 through the exhaust duct 5 to preheat the scrap material, the exhaust duct 5 being midway provided with combustion cylinder means (not shown) for complete combustion of unburned CO gas. The scrap material 13 which has been preheated by the material preheating device is charged at the top of the furnace shell 2 with the roof 3 being opened, using a bucket or the like.

More particularly, in a melting operation of the scrap material 13, the roof opening-and-closing device 6 lifts up the roof 3 and swings it outwardly to open the top of the furnace shell 2. Using a bucket or the like, the scrap material 13 which has been preheated by the preheating device is charged into the furnace shell 2. Then, the top of the furnace shell 2 is closed with the roof 3 and the gases in the furnace shell 2 is sucked by the exhaust duct 5. The upper electrode 4 is lowered gradually to a predetermined position and then the electrodes 1 and 4 are energized to generate and maintain an arc to melt the charged scrap material 13.

In this case, the substantial weight of the scrap material 13 is slight in comparison with volume thereof and a predetermined or desired quantity of molten metal cannot be obtained by only one charge. Therefore, after the completion of one charge, the electrodes 1 and 4 are de-energized and the furnace roof 3 is opened. New scrap material is charged into the furnace shell 2 and the melting operation is repeated in the manner described above. Then, the furnace shell 2 is tilted to pour the molten metal 10 through the spout into the ladle 12.

In the melting furnace of the type described above, whenever the scrap material is to be charged into the furnace shell 2, the furnace roof 3 must be opened. Such opening of the roof 3 causes various adverse problems. High-temperature exhaust gases are dispersed outside of the furnace and a considerably large quantity of heat is dissipated into the surrounding atmosphere, resulting in great heat loss; a considerably large quantity of dust is spread; the charging of the scrap material causes noise; upon charging of additional scrap material 13 the power source must be de-energized to stop the melting operation; and because of the arc time loss, the temperature of the molten metal 10 drops so that melting efficiency is substantially decreased.

In order to overcome the above-mentioned problems in the melting furnace, a melting furnace as shown in FIG. 2 has been proposed which is exemplarily in the form of a DC arc furnace with a scrap material preheating and charging apparatus 15. In order to permit charging of the scrap material 13, the furnace shell 2 is provided at its side with a material charging opening 14. The opening 14 is communicated with the scrap material preheating and charging apparatus 15 which extends laterally of the furnace shell 2. The device 15 is provided with a material preheating section 17 having a slide type material delivery device 16 at a laterally extending bottom of the device 15 as well as an exhaust duct 19 which is connected to an upper portion of an extension of the preheating section 17 and which is also connected to an exhaust device 18 having a heat exchanger, a dust collector, a suction fan and so on. The preheating section 17 is provided with burner means 20 to further heat the scrap material 13 which has been preheated by the high-temperature exhaust gases 24 and is being transported by the material delivery device 16.

A further example of a conventional scrap material preheating and charging apparatus is a rotary kiln type scrap material preheating and charging apparatus 22 as illustrated in FIG. 3 in which a rotatably driven preheating cylinder 21 is communicated at its lower end with a material charging opening 14 on the furnace roof 3 so as to have a predetermined angle of inclination. In this case, the scrap material 13 is fed to an upper end opening (i.e. the right end in the Figure) of the rotating cylinder 21 and is transported by rotation and inclination of the cylinder 21 toward the opening 14. This example is also provided with burner means 23 disposed above the opening 14 for heating of the scrap material.

FIG. 4 illustrates an example of a conventional, non-electrode type melting furnace. Molten steel is previously charged into a furnace shell 25 and the oxygen $O_2$ and fuel such as oil or coal is fed to the furnace so that the scrap material is heated and melted by combustion of the fuel. The furnace shell 25 is opened at its top to permit the discharge of high-temperature exhaust gases 24 from the shell 25. In this example, a vertical, material preheating and charging apparatus 32 comprises a material preheating section 29 having a plurality of slide gates 26, 27 and 28, each comprising a pair of gate sections slidable toward and away from each other to selectively close and open the passage of the exhaust gases 24 in the device 32. The device 32 further comprises an exhaust duct 30 opened above the material preheating section 29 and a sealing damper 31 located at a top end of the device for selective closing and opening the device so as to charge the scrap material 13 into the device.

In the above-described scrap material preheating and charging apparatus 15 or 22 shown in FIG. 2 or 3 having the material preheating section or cylinder 17 or 21 extending laterally of the furnace shell 2, the high-temperature exhaust gases 24 contact mainly with an upper surface of the scrap material 13 being transported in the form of a bed within the material preheating section or cylinder 17 or 21, resulting in considerably low heat exchange efficiency of the exhaust gases 24 with the scrap material 13. To compensate for this, the scrap material preheating and charging apparatus 15 or 22 is lengthened and the burner means 20 or 23 are required.

In the vertical, material preheating and charging apparatus 32 shown in FIG. 4, the slide gates 26, 27 and 28 and especially the lowermost slide gate 26 is directly exposed to the high-temperature exhaust gases 24 (about 1500° C.) from the furnace shell 25 and the slide gates 26, 27 and 28 must support the scrap material 13 which is heavy, so that the slide gates must be designed and constructed such that they can satisfactorily operate under these severe conditions. Thus, it has been difficult to use such vertical, material preheating and charging apparatus especially in view of economy and from the standpoint of maintenance and repair.

The present invention was made to overcome the above and other problems encountered in the prior art and has for its object to provide a scrap material preheating and charging apparatus which can preheat, at higher exchange efficiency, scrap material by high-temperature exhaust gases from a furnace shell, can prevent moving parts from being directly exposed to the high-temperature exhaust gases from the furnace shell to thereby enhance strength of the apparatus and can substantially continuously charge the preheated scrap material into the furnace shell.

DISCLOSURE OF THE INVENTION

According to the present invention, scrap material is supplied through a sealing section to a heat exchanger section where it is preheated very effectively at higher heat exchange efficiency by high-temperature exhaust gases flowing upwardly from the furnace shell through a throat section into the heat exchanger section. The scrap material which has been preheated in the heat exchange section is transferred in the throat section by actuation of a material delivery device and substantially continuously charged into the furnace shell through a material charging inlet at an end of the throat section.

Because of the scrap material preheating and charging apparatus having the throat section, the high-temperature exhaust gases do not directly and adversely affect movable parts of, for example, the material delivery device. The delivery device serves only to deliver the scrap material and supports no weight of the scrap material, which in fact is greatly advantageous from the standpoints of thermal effect and strength. Such fact also brings about structural simplification and compactness in size of the apparatus.

The angle of inclination of the throat section may be between 3 and 25 degrees. The height of the cutout pusher means of the material delivery device may be at most ½ of that of the throat section and the stroke of the pusher means is larger than the width of the heat exchanger section in the direction of movement of the pusher means. As a result the scrap material can be positively charged into the material charging inlet by relatively weak pushing force.

An upper portion of the heat exchanger section may extend laterally and upwardly to define an additional throat section which is communicated with a further heat exchanger section provided above the additional throat section. Each of the heat exchanger sections may have less capacity to prevent compaction of the scrap material for attainment of cutout of the scrap material in a further reliable manner and to improve heat exchange efficiency of the scrap material with the exhaust gases.

The scrap material dropped from the throat section may be firstly received by a material receiving stand so that the block of the scrap material is broken. The broken scrap material is then transported on the receiving stand by a pushing device into the material charging opening. Because of a guide provided above the receiving stand, the upper portion of the scrap material being transported is scraped and the scrap material does not exceed the guide. Therefore, the scrap material is quantitatively charged into the furnace shell in small quantities, which in fact contributes to decreasing flicker and minimizing splashing of the molten metal.

The guide may be supported such that the guide can be vertically controlled in terms of position so as to adjust the distance of the guide from the material receiving stand, which contributes to stable cutout of the scrap material by a material cutout device. The guide in the form of rotating roller prevents the scrap material from being caught by the guide so that the scrap material is cut out in a stable manner.

The material receiving stand may be supported by weighing means upon quantitative cutout of the scrap material by the material cutout device, so that the charged quantity of the scrap material into the furnace shell is correctly measured.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BEST MODES FOR CARRYING OUT THE INVENTION

Embodiments of the present invention will now be explained in conjunction with the accompanying drawings.

Figure 1:
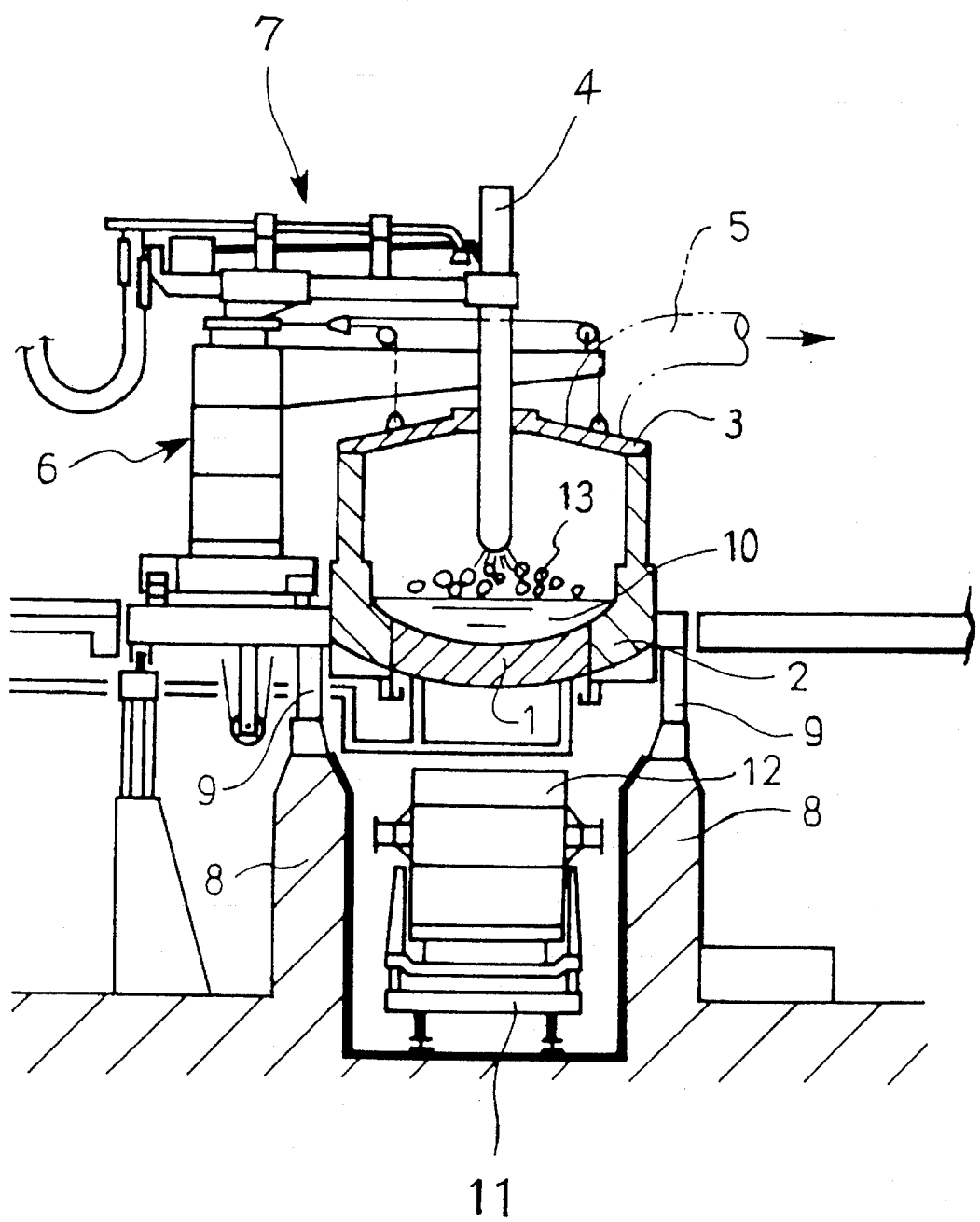
FIG. 1 is a front view partially in section of a conventional DC arc furnace.
Figure 2:
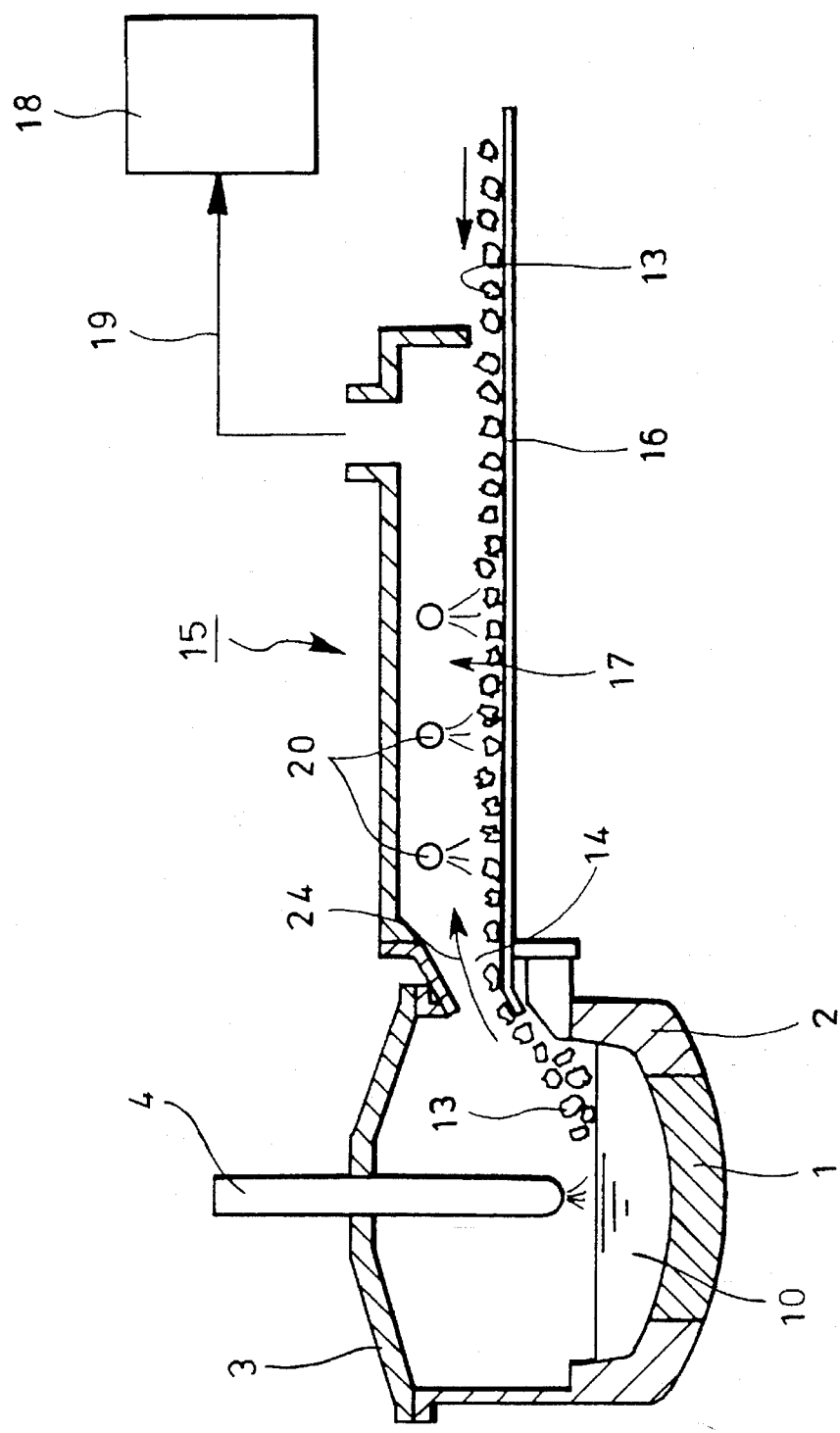
FIG. 2 is a side view in section of a conventional scrap material preheating and charging apparatus.
Figure 3:
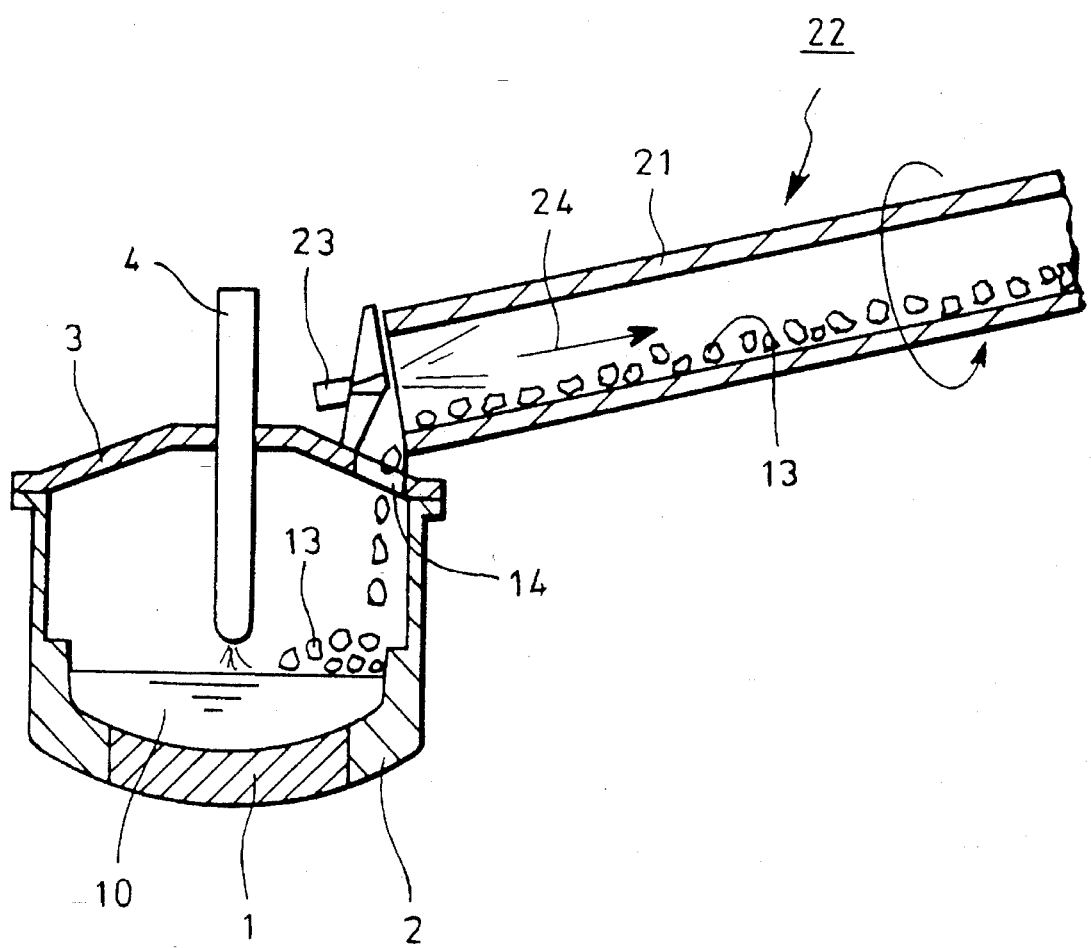
FIG. 3 is a side view in section of a conventional rotary kiln type scrap preheating and charging apparatus.
Figure 4:
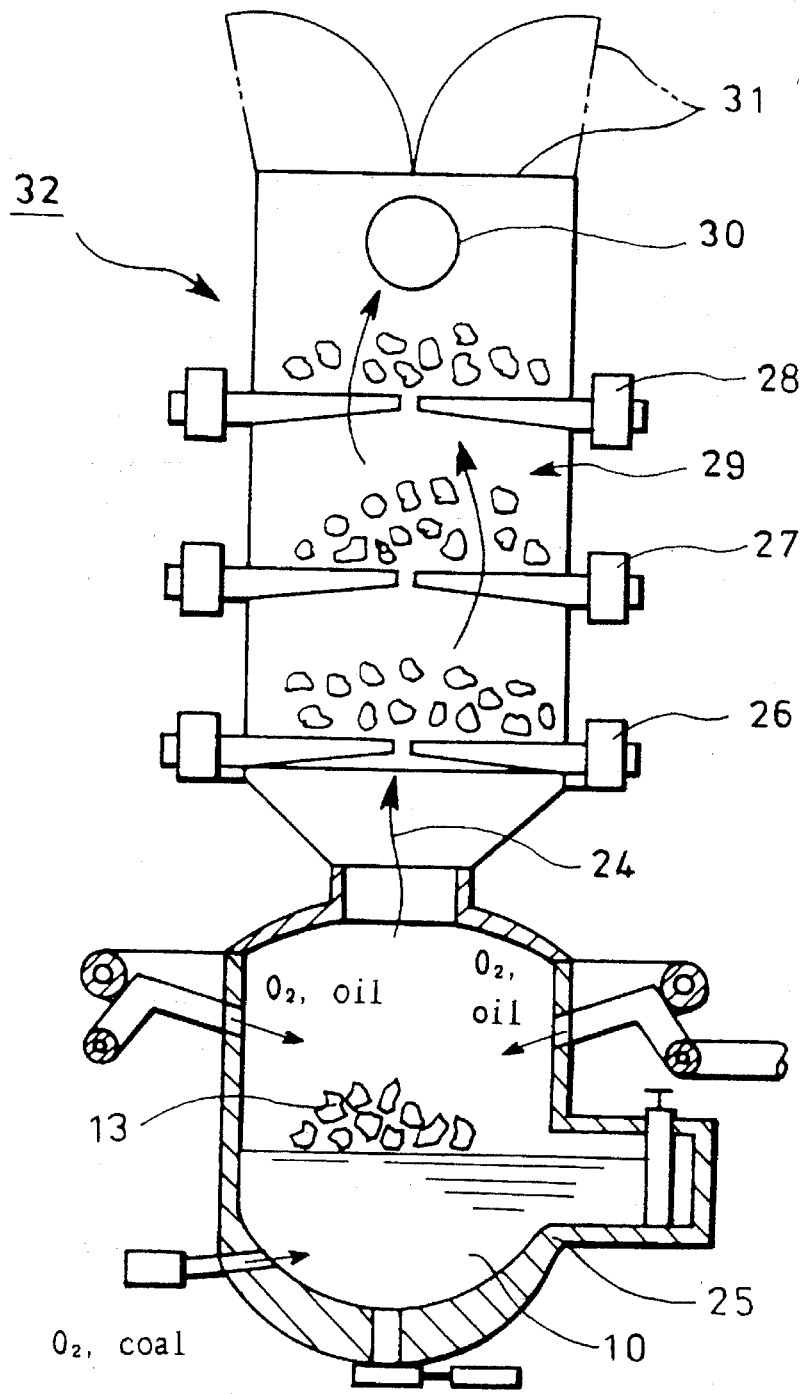
FIG. 4 is a side view in section of a conventional vertical, material preheating and charging apparatus.
Figure 5:
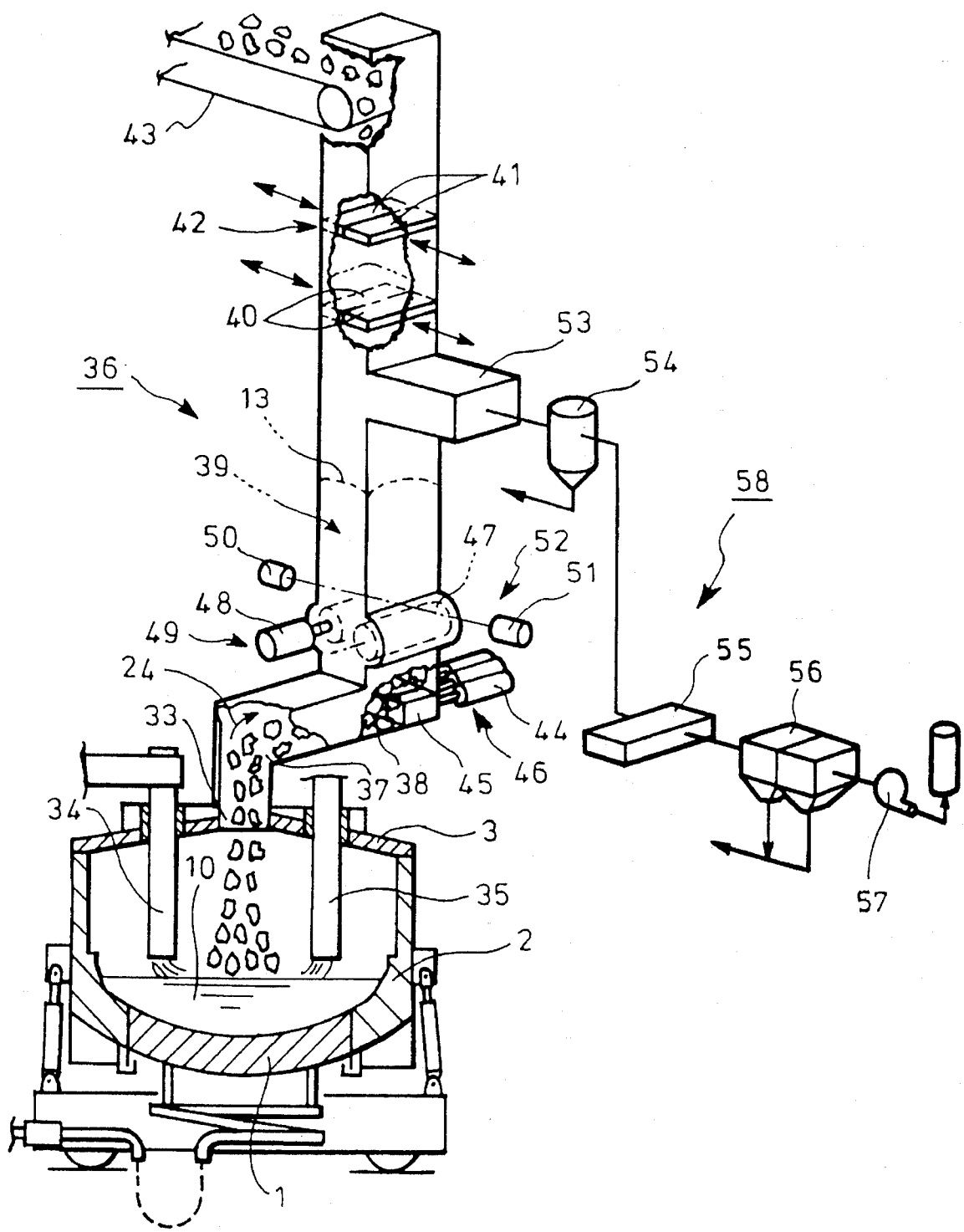
FIG. 5 is a perspective view partially in section of a first embodiment of the invention.

FIG. 5 illustrates an embodiment of a first aspect of the invention applied to a DC arc furnace. A furnace shell 2 has a bottom electrode 1 at its bottom and is closed at its upper opening by a furnace roof 3. A material charging opening 33 is formed through the roof 3 substantially coaxially thereof. Two upper electrodes 34 and 35 vertically extend through the roof 3 and are diametrically opposite to each other. A scrap material preheating and charging apparatus 36 is arranged above the opening 33

The scrap material preheating and charging apparatus 36 has a throat section 38 which has at its one end a scrap material charging inlet 37 communicated with the charging opening 33 and which extends laterally and upwardly obliquely. The other end of the throat section 38 is connected to a packed bed type heat exchanger section 39 which extends upwardly. The upper end of the heat exchanger section 39 is connected to a sealing section 42 which comprises upper and lower dampers 41 and 40 each having horizontally slidable damper elements to selectively open and close an upper opening of the heat exchanger section 39. The upper end of the sealing section 42 is connected to a material supply means 43 such as conveyer to supply scrap material 13 to the sealing section 42.

The other end of the throat section 38 is provided with a material delivery device 46 comprising cutout pusher means 45 moved by drive means 44 such as cylinders installed outside so that the pusher means 45 are reciprocated longitudinally of the throat section 38 along the bottom thereof.

A bridging preventive device 49 is installed in the heat exchanger section 39 immediately above the delivery device 46 and comprises a pair of horizontally extending rollers 47 each of which is disposed in a curved space defined by bulging a part of the side wall of the heat exchanger section 39 and motors 48 for rotatably driving the rollers 47 so that the scrap material 13 can be prevented from forming a bridge and positively fed to the delivery device 46. A bridging detector 52 is installed above the bridging preventive device 49 and comprises a light source 50 and a light sensor 51 so that any bridging of scrap material 13 can be automatically detected. It is to be noted that the instead of optical detection of the bridging using the above-mentioned light source and sensor 50 and 51, magnetic or electrical detection may be effected using magnetic elements, load cells or the like.

A portion of the heat exchanger section 39 just below the sealing section 42 is connected to an exhaust duct 53 which in turn is connected to an exhaust system 58 comprising a combustion device 54 for burning inflammable gases having been evaporated from the scrap material 13 into the exhaust gases 24, a heat exchanger 55 for recovering heat from the exhaust gases, a dust collector 56 and a suction fan 57.

In the embodiment shown in FIG. 5, the dampers 40 and 41 are normally closed. The scrap material 13 is dropped to the upper damper 41 from the supply means 43. Then, the upper damper 41 is opened to drop the scrap material 13 thereon onto the lower damper 40 and the upper damper 41 is closed. After all of the scrap material has been dropped onto the lower damper 40, the lower damper 40 is opened to supply the scrap material 13 to the packed bed type heat exchanger section 39. This substantially prevents the high-temperature exhaust gases 24 from escaping outside through the sealing section 42 and the surrounding atmosphere from intruding.

The scrap material 13 supplied to the heat exchanger section 39 is partly delivered to the throat section 38, is partly accumulated in the heat exchanger section 39 and is effectively preheated by the high-temperature exhaust gases 24 flowing from the furnace shell 2 through the scrap material 13 in the throat section 38 into the heat exchanger section 39 since the heat exchanger section 39 is of the packed bed type and has higher heat exchange efficiency.

The scrap material 13 preheated in the heat exchanger section 39 drops to the material delivery device 46 without bridging owing to the bridging preventive device 49 and is transported by the device 46 through the throat section 38 and then is substantially continuously charged through the charging inlet 37 into the furnace shell 2. In this case, the quantity of scrap material charged into the furnace shell 2 by each reciprocal movement of the delivery device 46 can be freely adjusted by controlling the driving speed or reciprocating stroke of the drive means 44 such as cylinders.

The exhaust gases 24 which have flowed up through the heat exchanger section 39 and have undergone heat-exchanged with the scrap material 13 in the heat exchanger section 39 are sucked through the exhaust duct 53 into the exhaust system 58 where they are suitably processed or treated.

Because of the scrap material preheating and charging apparatus 36 having the throat section 38 extending laterally from the inlet 37 as mentioned above, the scrap material 13 is also accumulated in the throat section 38, which prevents movable parts of for, example, the material delivery device 46 from being directly exposed to the high-temperature exhaust gases 24. The fact that delivery device 46 serves only to deliver the scrap material 13 and supports no weight of the scrap material 13 is greatly advantageous from the standpoints of thermal effect and strength and brings about structural simplification of the device, ease of maintenance thereof and compactness in size of the whole apparatus.

Figure 6:
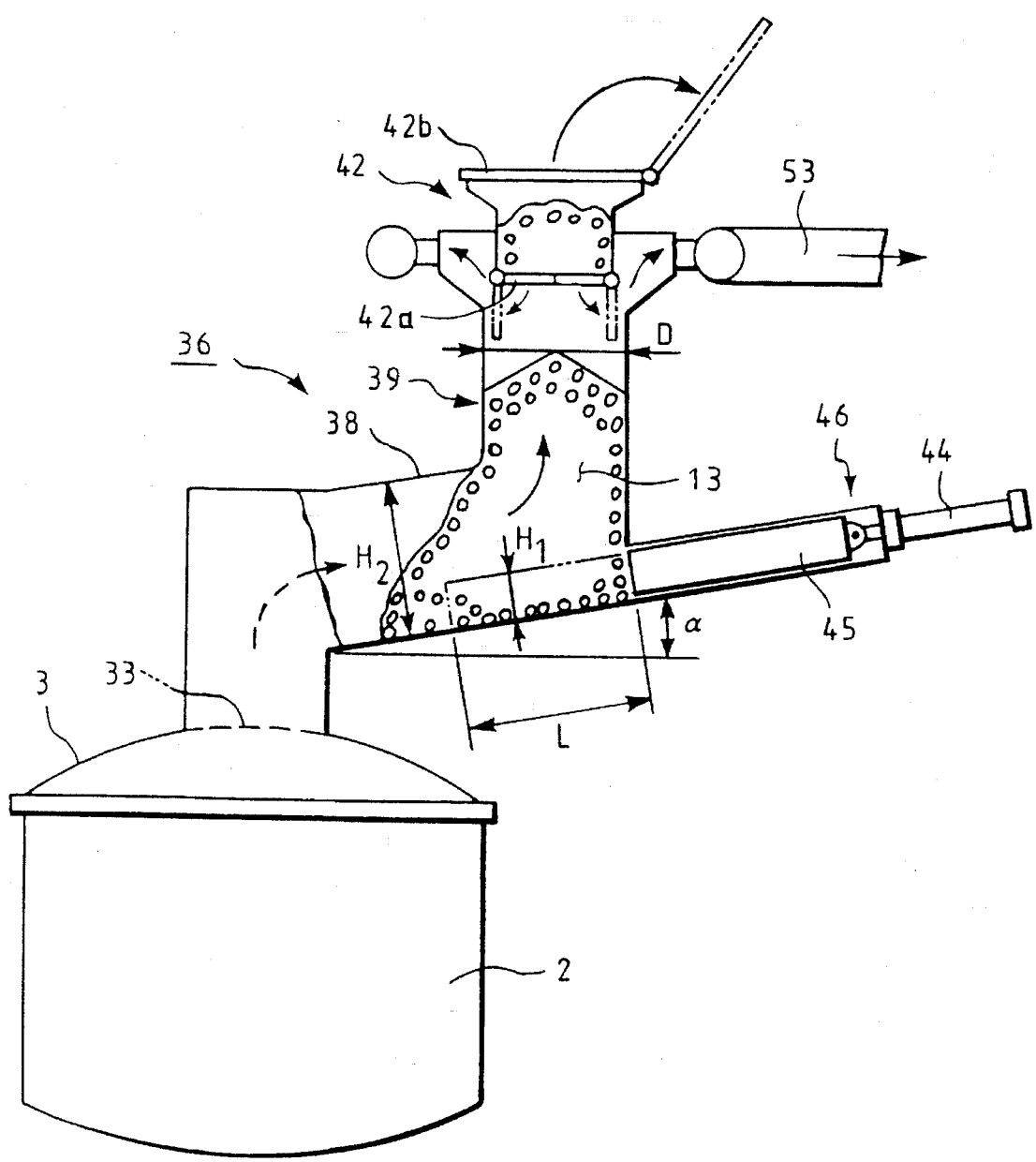
FIG. 6 is a side view partly in section of a second embodiment of the invention.

FIG. 6 illustrates a second embodiment of the invention which has the throat section 38 with the angle α of inclination between 3 and 25 degrees. The cutout pusher means 45, which constitute the material delivery device 46 and are driven by the drive means 44 such as cylinders, have a height $H_1$ which is at most ½ of height $H_2$ of the throat section 38 and have a stroke L which is greater than the width D of the heat exchanger section 39 in the direction of movement of the pusher means 45. In this embodiment, the sealing section 42 comprises pivotable shelves 42a and a pivotable roof 42b at an upper end.

Figure 7:
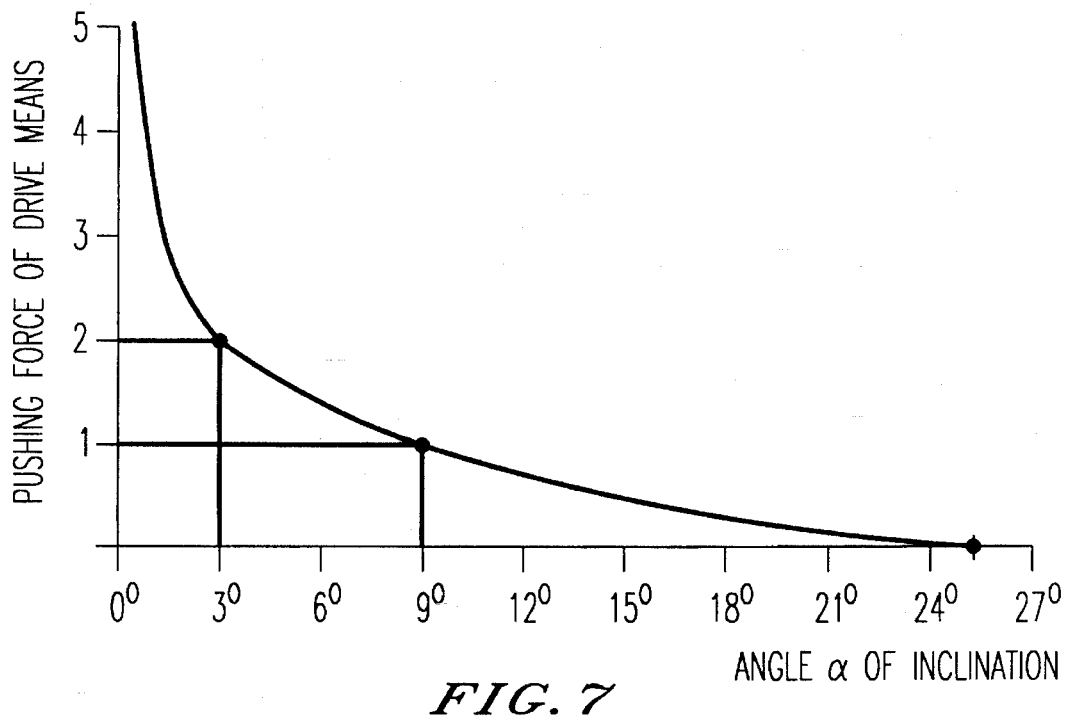
FIG. 7 is a diagram illustrating the relationship between the angle of inclination of throat section and the pushing force of the drive means in FIG. 6.

FIG. 7 illustrates the results obtained upon investigation of the relationship between the angle a of inclination of the throat section 38 and the minimum pushing force required for delivering a predetermined quantity of scrap material 13 into the furnace shell 2 by the drive means 44 of the delivery device 46. Supposing the required pushing force to be 1 when the angle α of inclination is 9 degrees, it is seen that the pushing force is doubled when the angle α is 3 degrees and becomes zero when α is 25 degrees. When the angle α is less than 3 degrees, the required pushing force is too great while when the angle α is in excess of 25 degrees, there occurs a problem in that the scrap material 13 may drop by itself. In view of these, the angle α of inclination of the throat section 38 is set to be between 3 and 25 degrees.

Figure 8:
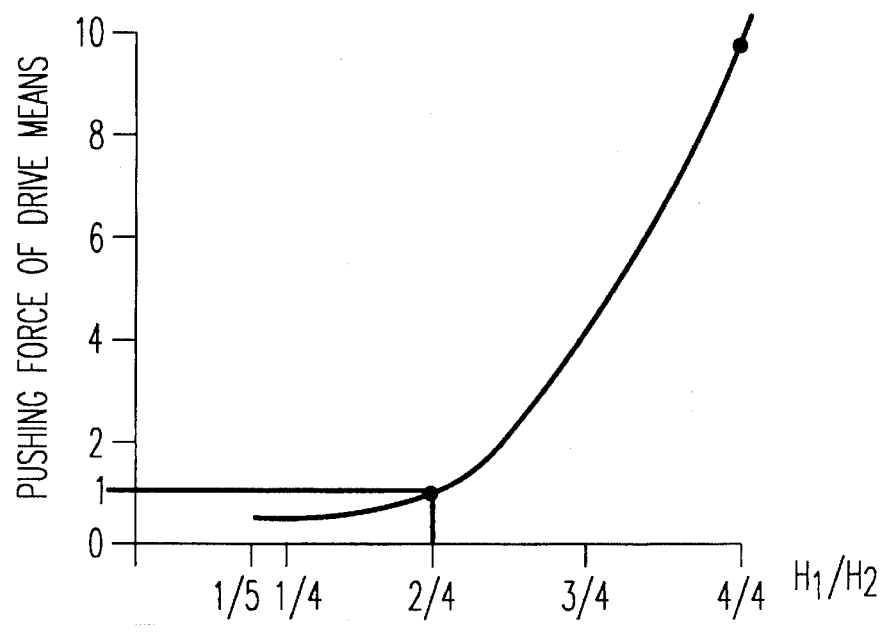
FIG. 8 is a diagram illustrating the relationship between the ratio of the height of the cutout pusher means to the throat section as compared with the pushing force of the drive means in FIG. 6.

FIG. 8 illustrates the results obtained upon investigation of the relationship between height ratio $H_1/H_2$ and the scrap material pushing force of the drive means 44. It is seen that when the height ratio is less than ⅕, the strength of the pusher means 45 cannot be increased so that the cutout pusher means 45 are broken; this is limitation in terms of strength of the pusher means 45. When the height ratio is in excess of ½, the required pushing force is extremely increased. In view of these, the height ratio $H_1/H_2$ is set to be between ⅕ and ½.

Next, the influence of the stroke L of the pusher means 45 was investigated. When the stroke of the pusher means 45 is greater than the width D of the heat exchanger section 39 in the direction of movement of the pusher means 45 (L>D), the pushing force of the drive means 44 is remarkably decreased. On the the other hand, when L<D, the pushing force is considerably increased. In view of this, the stroke L of the pusher means 45 is set to be greater than the width D of the heat exchanger section 39.

In the embodiment shown in FIG. 6, the angle a of inclination of the throat section 38 is between 3 and 25 degrees; the ratio of height $H_1$ of the pusher means 45 of the delivery device 46 to height $H_2$ of the throat section 38 is at most ½; and the stroke L of the pusher means 45 is greater than the width D of the heat exchanger section 39 in the direction of movement of the pusher means 45. Therefore, the scrap material 13 can be positively charged into the charging opening 33 by a relatively small pushing force of the pusher means 45.

Figure 9:
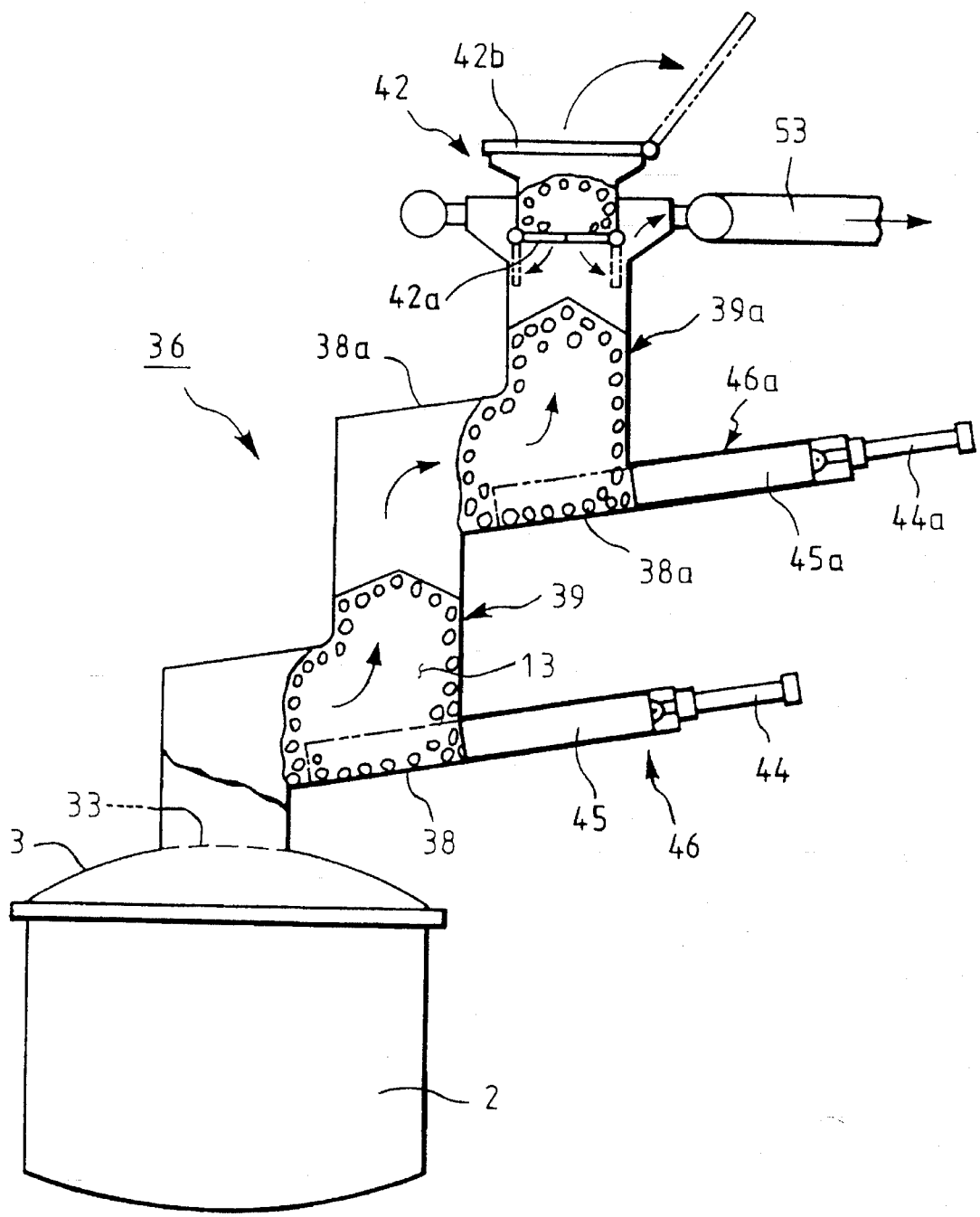
FIG. 9 is a side view partially in section of a third embodiment of of the invention.

FIG. 9 illustrates an embodiment of a third embodiments of the invention in which an upper portion of the packed bed type heat exchanger section 39 extends laterally and upwardly obliquely to define an additional throat section 38a which is communicated at its upper end with an additional packed bed type heat exchanger section 39a. Thus, the scrap material preheating and charging apparatus has a plurality of heat exchanger sections 39 and 39a which are provided, at the throat sections 38 and 38a, with material delivery devices 46 and 46a, respectively.

Figure 10:
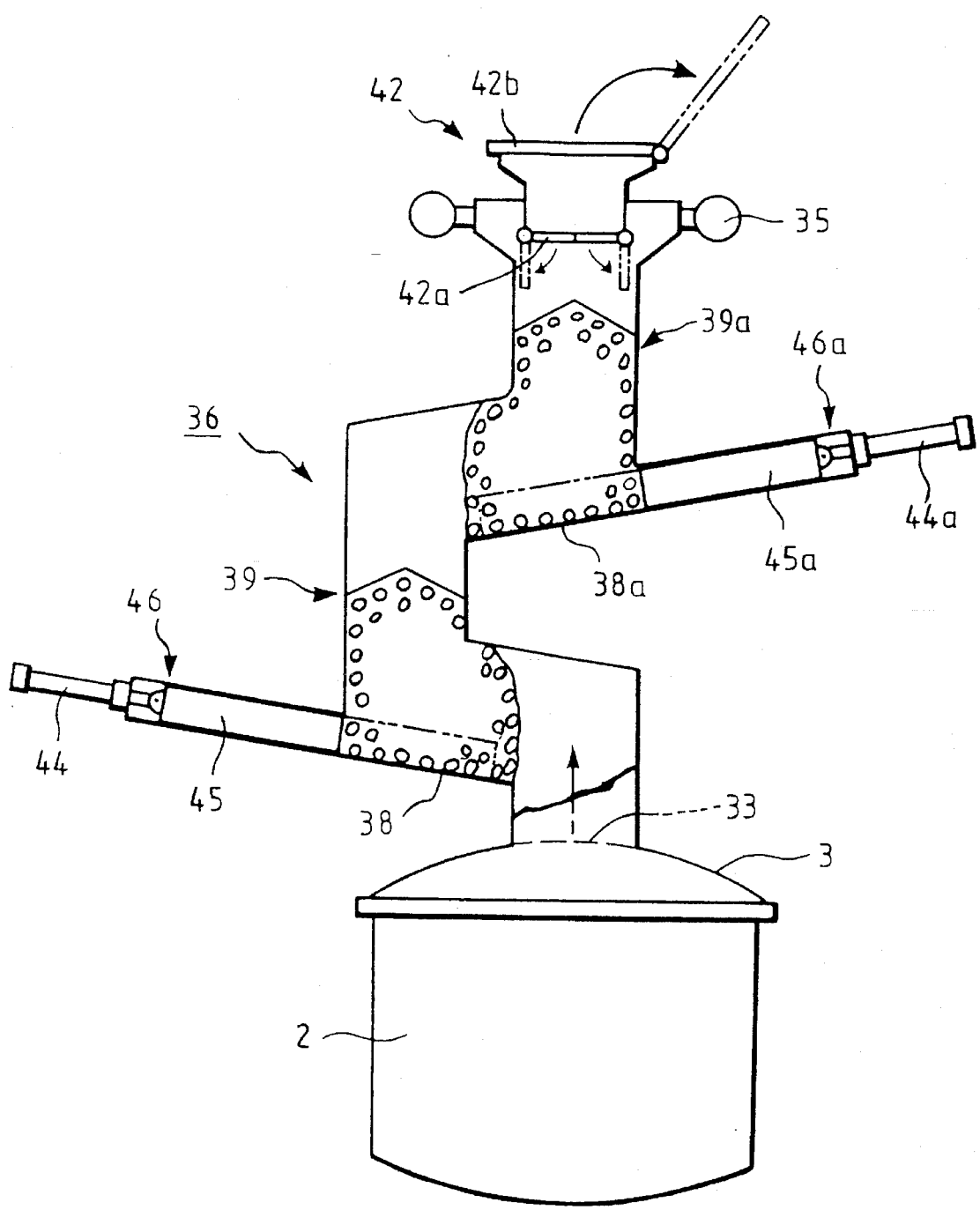
FIG. 10 is a side view partially in section of a further embodiment of the invention shown in FIG. 9.

FIG. 10 illustrates a further embodiment of the aspect of the invention shown in FIG. 9 which is substantially similar to FIG. 9 except that the throat sections 38 and 38a extend in opposite directions, rather than in the same direction as in FIG. 9.

In the embodiments shown in FIGS. 9 and 10 each with the upper portion of the heat exchanger section 39 extending laterally and upwardly obliquely to define the additional throat section 38a which is communicated at its upper end with the additional heat exchanger section 39a, thereby providing a plurality of heat exchanger sections 39 and 39a, each of the heat exchanger sections 39 and 39a may have less capacity to prevent compaction of the scrap material 13 so that pusher means 45 and 45a relatively small in size can cut out the scrap material 13 in a further reliable manner and the heat exchange efficiency of the scrap material 13 with the exhaust gases can be improved.

Figure 11:
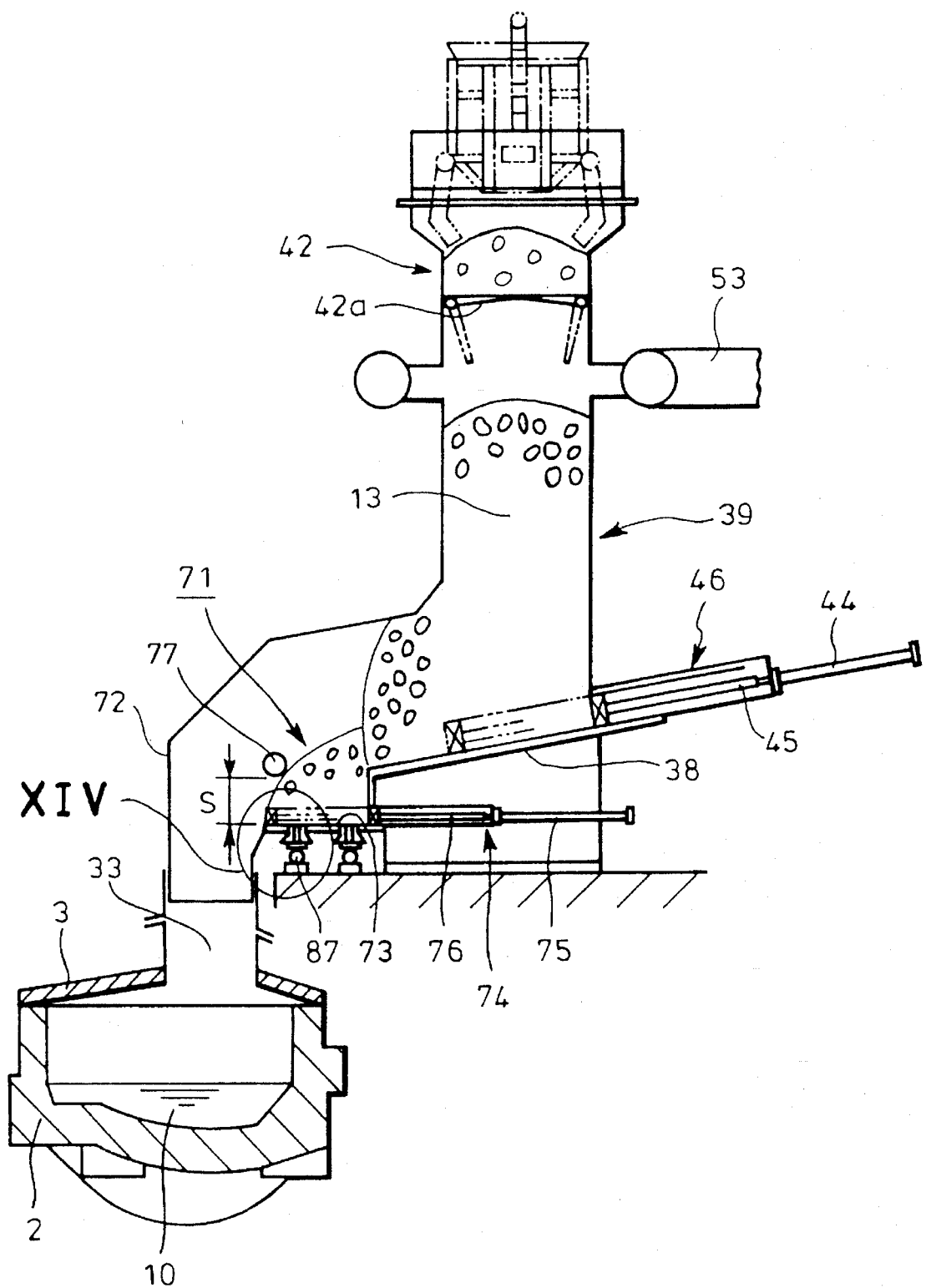
FIG. 11 is a side view partially in section of a forth embodiment of the invention.

FIG. 11 illustrates an embodiment of a fourth embodiments of the invention in which a material feeding device 71 is between the throat section 38 and the charging opening 33.

The material feeding device 71 is provided with a material receiving stand 73 (see FIG. 14) which is disposed in a cutout chute 72 between a lower end of the throat section 38 and the material charging opening 33. The receiving stand 73 receives the scrap material 13 which slides and drops from the throat section 38 by the material delivery device 46. The material feeding device 71 is further provided with a pushing device 74 which is disposed below the throat section 38 and which pushes and drops the scrap material 13 into the charging opening 33. The pushing device 74 comprises drive means 75 such as cylinders disposed outside and cutout pusher means 76 which are driven by the drive means 75 so that the pusher means 76 reciprocate in the longitudinal direction of the throat section 38. The receiving stand 73 has an smaller area which is approximately ½ of that of the throat section 38 and the pushing device 74 has a smaller stroke which is also approximately ½ of that of the delivery device 46.

A rod-like, material guide 77 is disposed in parallel with the material receiving stand 73 and extends across the chute 72. The guide 77 is above the stand 73 and spaced apart from the latter by S. The guide 77 may have various cross sections such as those of a roller, a pipe, a plate and a polygon; preferably, the guide 77 has roller- or pipe-like cross section in order to prevent the scrap material 13 from being caught by the guide 77.

Figure 12:
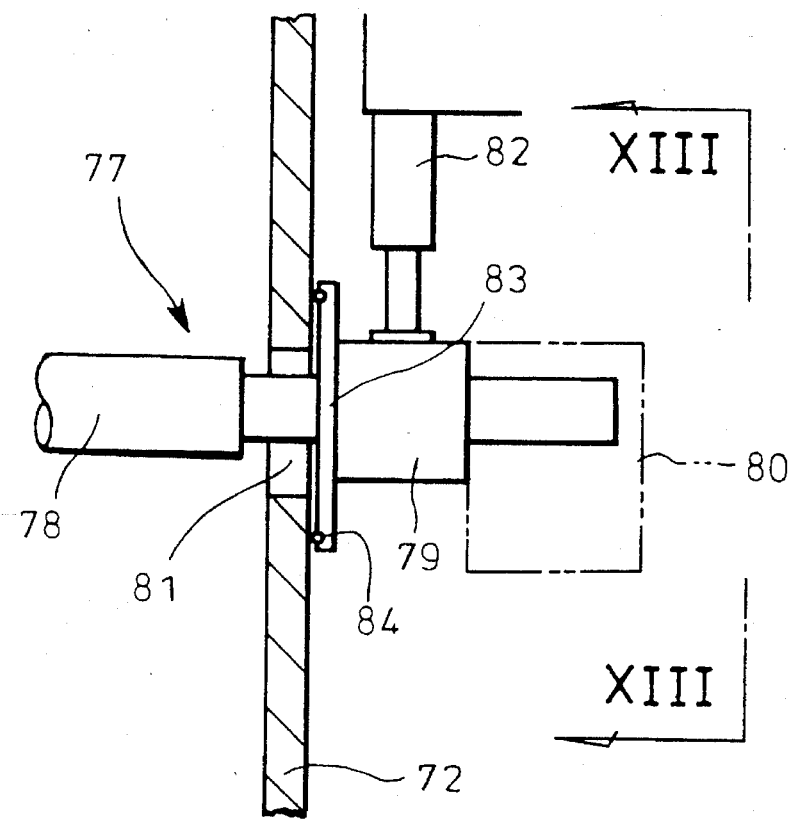
FIG. 12 shows a front view of the fifth and sixth embodiments of the inventions.
Figure 13:
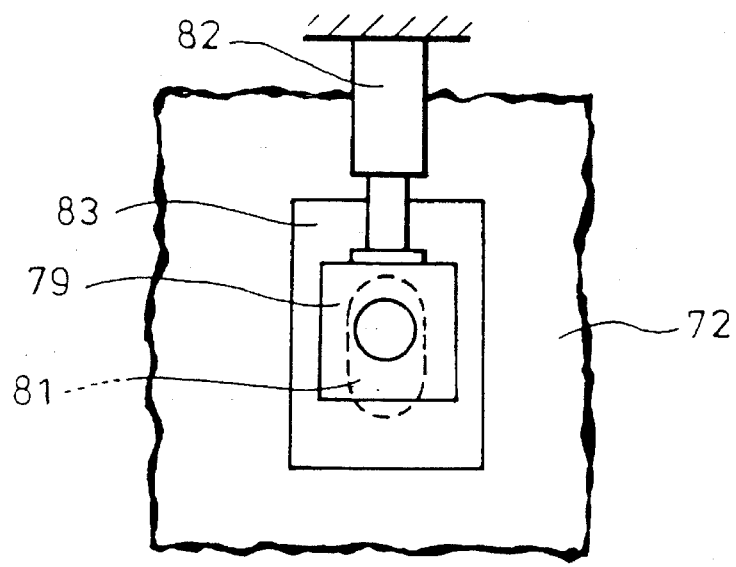
FIG. 13 is a view taken along line XIII—XIII in FIG. 12.

FIGS. 12 and 13 illustrates embodiments of fifth and sixth embodiments of the invention with the scrap material guide 77 being in the form of rotating roller 78, extending through the chute 72 and being rotatably supported by bearings 79 outside of the chute 72. The roller 78 may be freely rotatable; alternatively, drive means 80 as indicated by imaginary lines in FIG. 12 may be employed to positively rotate the roller 78 in a desired direction.

The bearing 79 receives the roller 78 via a vertically elongated slot 81 on the chute 72 and is vertically movably supported by a cylinder 82 so that the roller can be vertically controlled in position. In the Figures, reference numeral 83 denotes a sealing plate which is carried by the bearing 79 to cover the elongated slot 81 through a sealing member 84.

Figure 14:
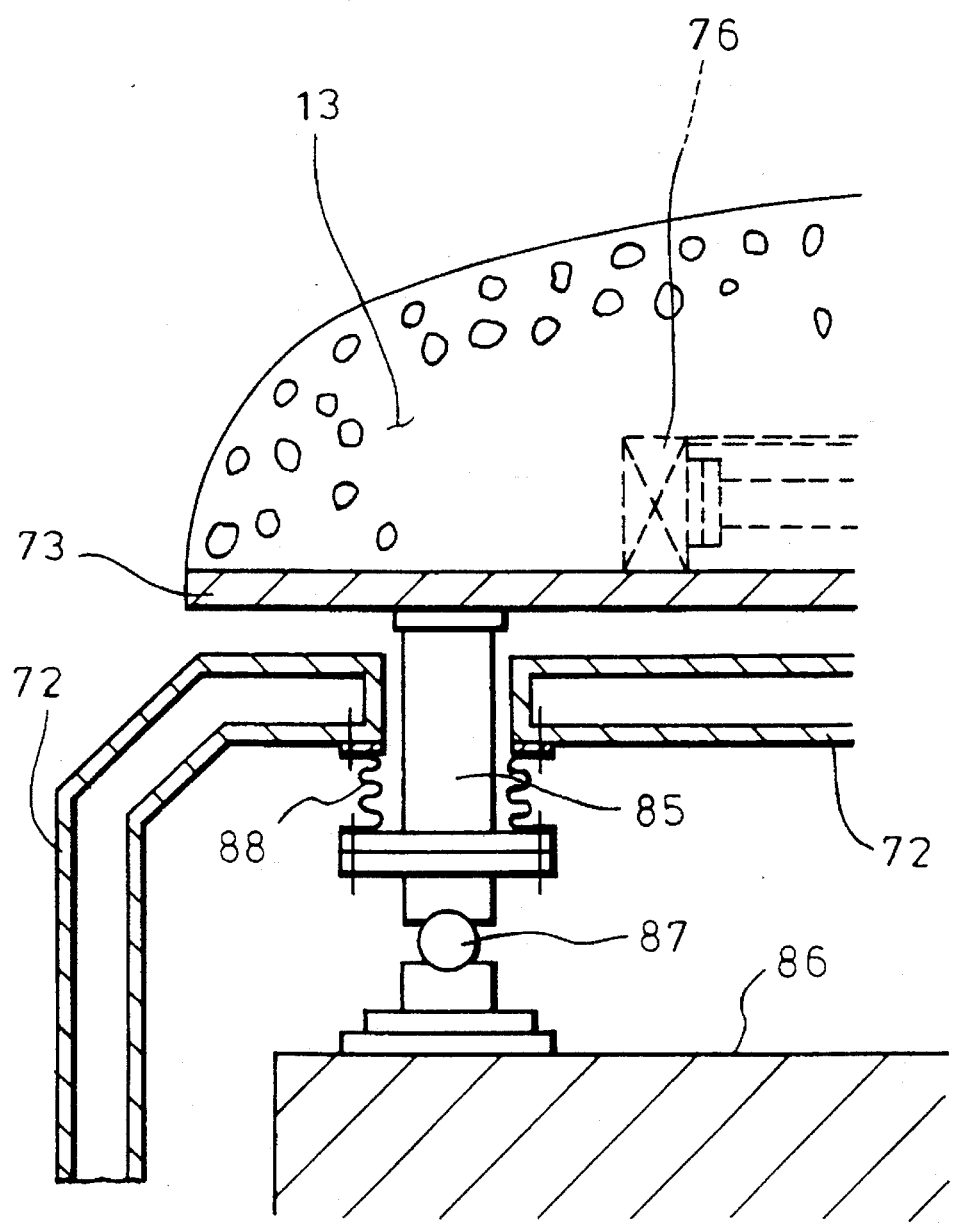
FIG. 14 is a view, on an enlarged scale, of a seventh embodiment of the invention, taken along line XIV—XIV.
Figure 15:
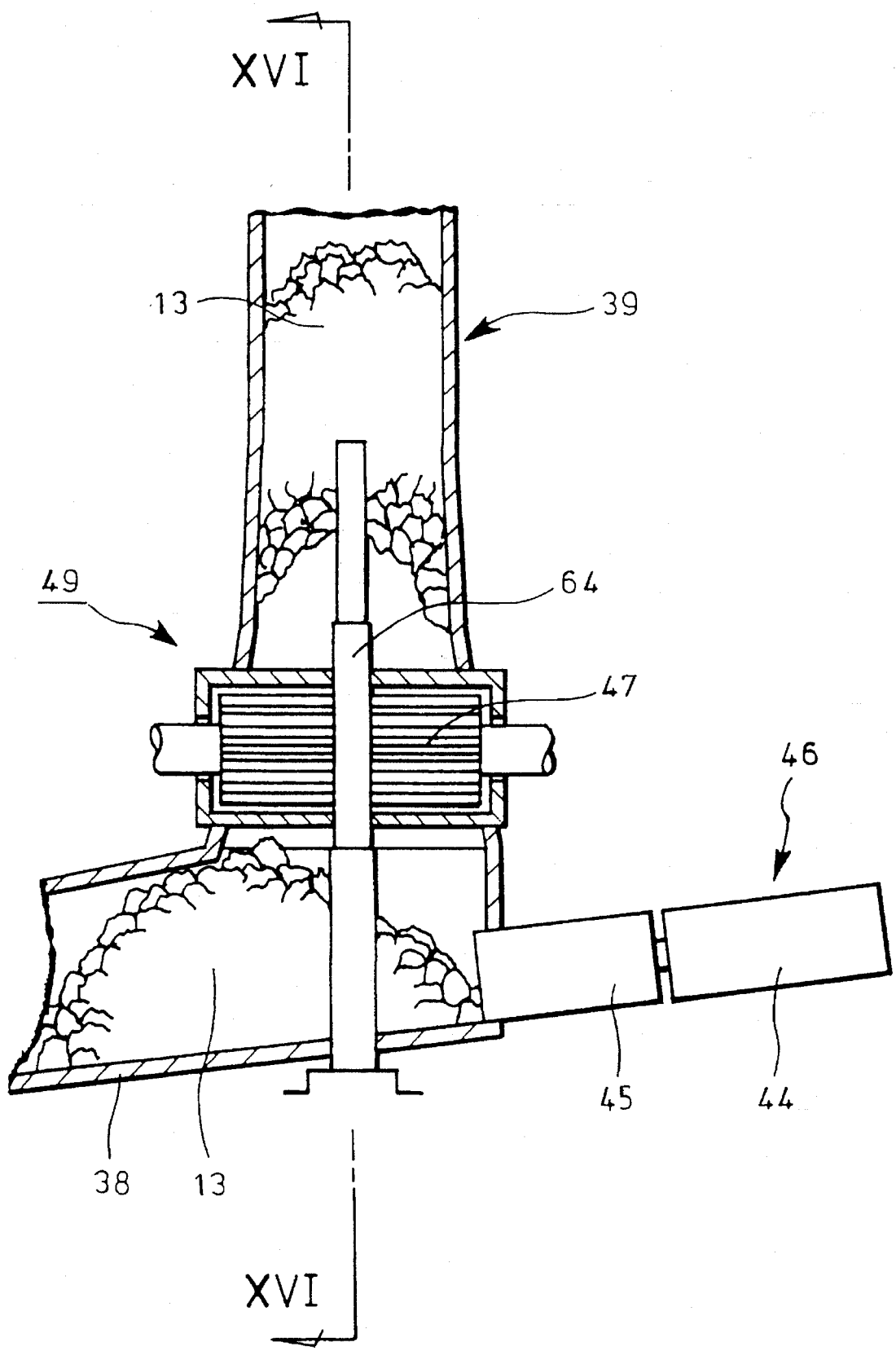
FIG. 15 is a side view in section of a an example of bridging preventive device.
Figure 16:
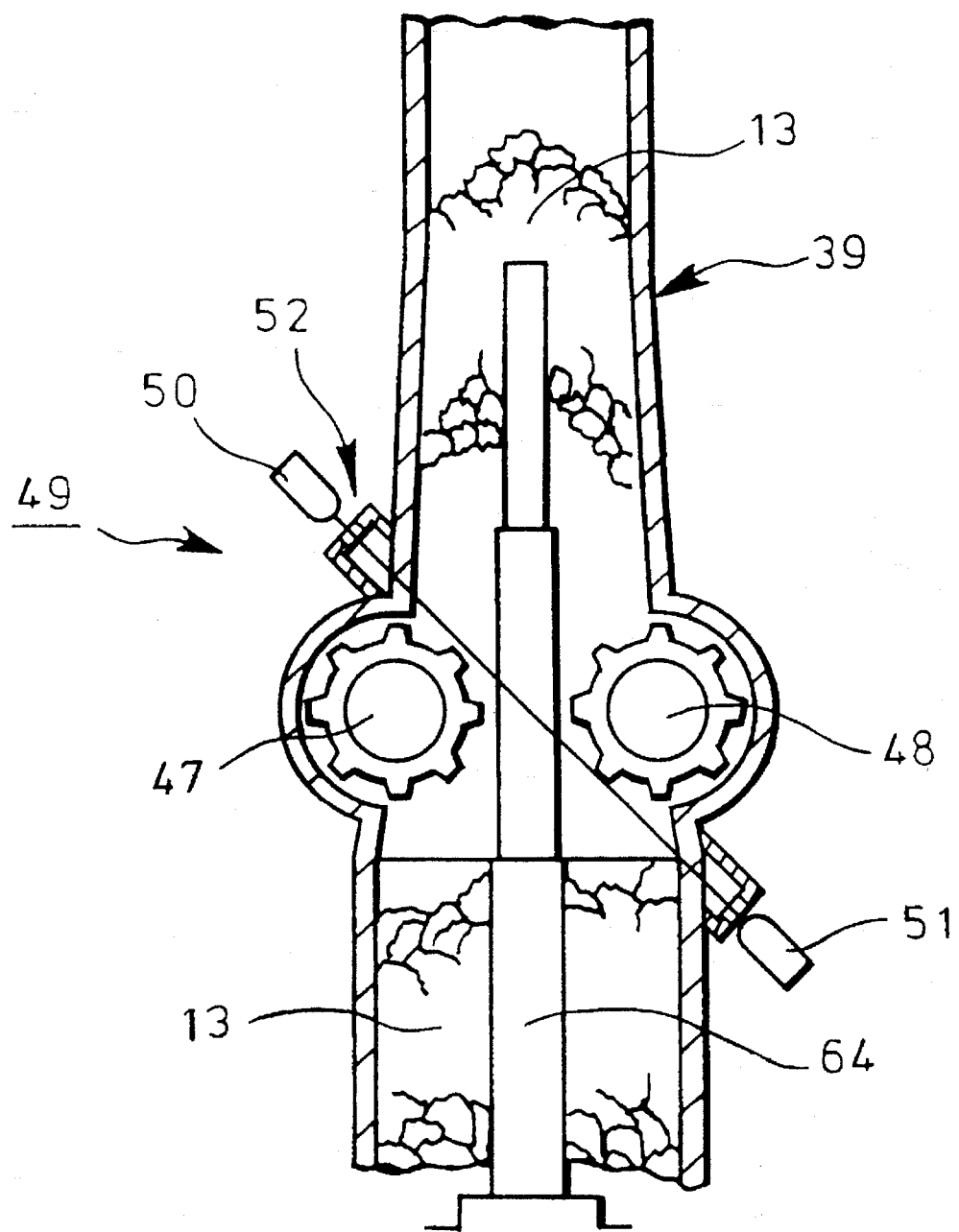
FIG. 16 is a sectional view taken along the line XVI—XVI in FIG. 15.

FIG. 14 illustrates a seventh embodiment of the invention. The receiving stand 73 shown in FIG. 11 is supported at its lower surface by supporting post means 85 which vertically extend through the chute 72 and which in turn is supported through weighing means 87 by a lower stationary member 86. Reference numeral 88 denotes a sealing bellows which surrounds the supporting post means 85 at a position where the latter extends through the chute 72.

In the embodiment shown in FIG. 11, the scrap material 13 delivered out by the material delivery device 46 drops from the throat section 38 over the material receiving stand 73 of the material cutout device 71.

Without the material cutout device 71, the scrap material 13 from the throat section 38 would become a large block which drops from the chute 72 into the furnace shell 2 through the charging opening 33 so that voltage regulation or flicker would be increased to greatly vary power efficiency. Another problem is that drop of such large block of scrap material 13 into the furnace shell 2 would cause the molten steel in the furnace shell 2 to splash, damaging an inner surface of the furnace shell 2.

However, according to the arrangement shown in FIG. 11, the scrap material 13 from the throat section 38 is first received by the material receiving stand 73 so that the block of the scrap material is broken. The broken scrap material 13 is then transported over the material receiving stand 73 by the pushing device 74 and then drops into the charging opening 33. Since the guide 77 is provided above the receiving stand 73, an above portion of the scrap material 13 being transported is scraped so that the scrap material 13 will not exceed the guide 77. Therefore, the scrap material 13 is quantitatively charged into the furnace shell 2 in small quantities, which contributes to decreasing the flicker and minimizing the splashing of the molten metal.

In the embodiments shown in FIGS. 12 and 13, the material guide 77 is vertically adjustably supported for adjustment of the distance S of the guide 77 from the receiving stand 73 so that the material cutout device 71 can cut out the scrap material 13 in a stable manner. The guide 77 in the form of rotating roller 78 will prevent the scrap material 13 from being caught by the guide 77 so that the scrap material is cut out in a stable manner.

In the embodiment shown in FIG. 14, the weighing means 87 which support the receiving stand 73 carry out weighing when the material feeding device 71 quantitatively cuts out the scrap material 13. Therefore, quantity of the scrap material 13 charged into the furnace shell 2 can be correctly measured.

FIGS. 15–18 show variations of the bridging preventive device 49 shown in FIG. 5 with the paired rollers 47 which have other means added. The variation shown in FIGS. 15 and 16 has a breaking rod 64 for expansion through the bottom of the throat section 38 into the heat exchanger section 39. Any bridging is detected by an optical bridging detector 52 and the breaking rod 64 is expanded to break the bridging.

Figure 17:
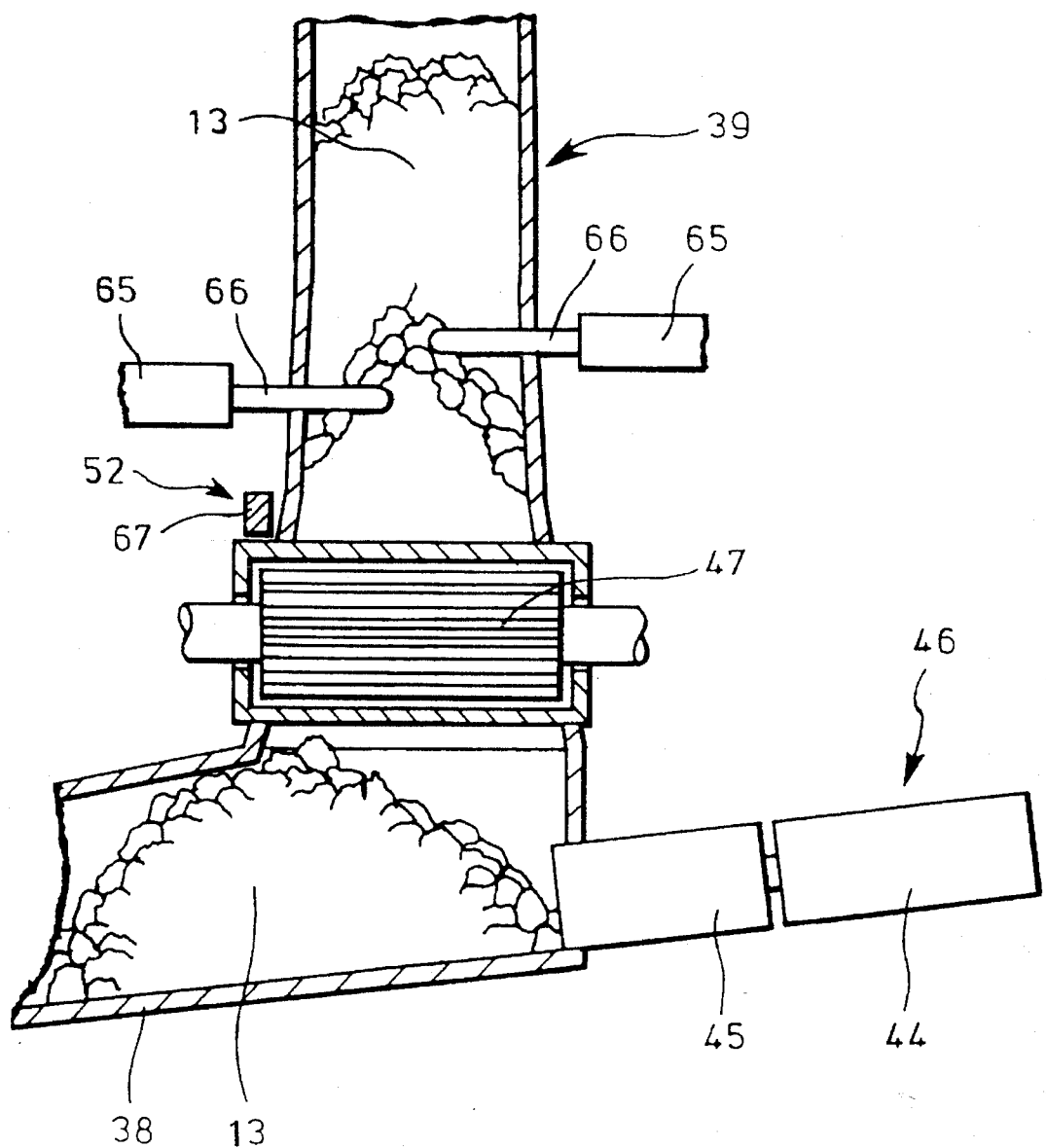
FIG. 17 is a side view in section of a further example of the bridging preventive device.

In the further variation shown in FIG. 17, the heat exchanger section 39 is provided at its lower portion with breaking rod means 66 adapted to be driven by cylinders 65 or the like for their radial expansion. Any bridging is detected by a magnetic bridging detector 52 with an electromagnet 67.

Figure 18:
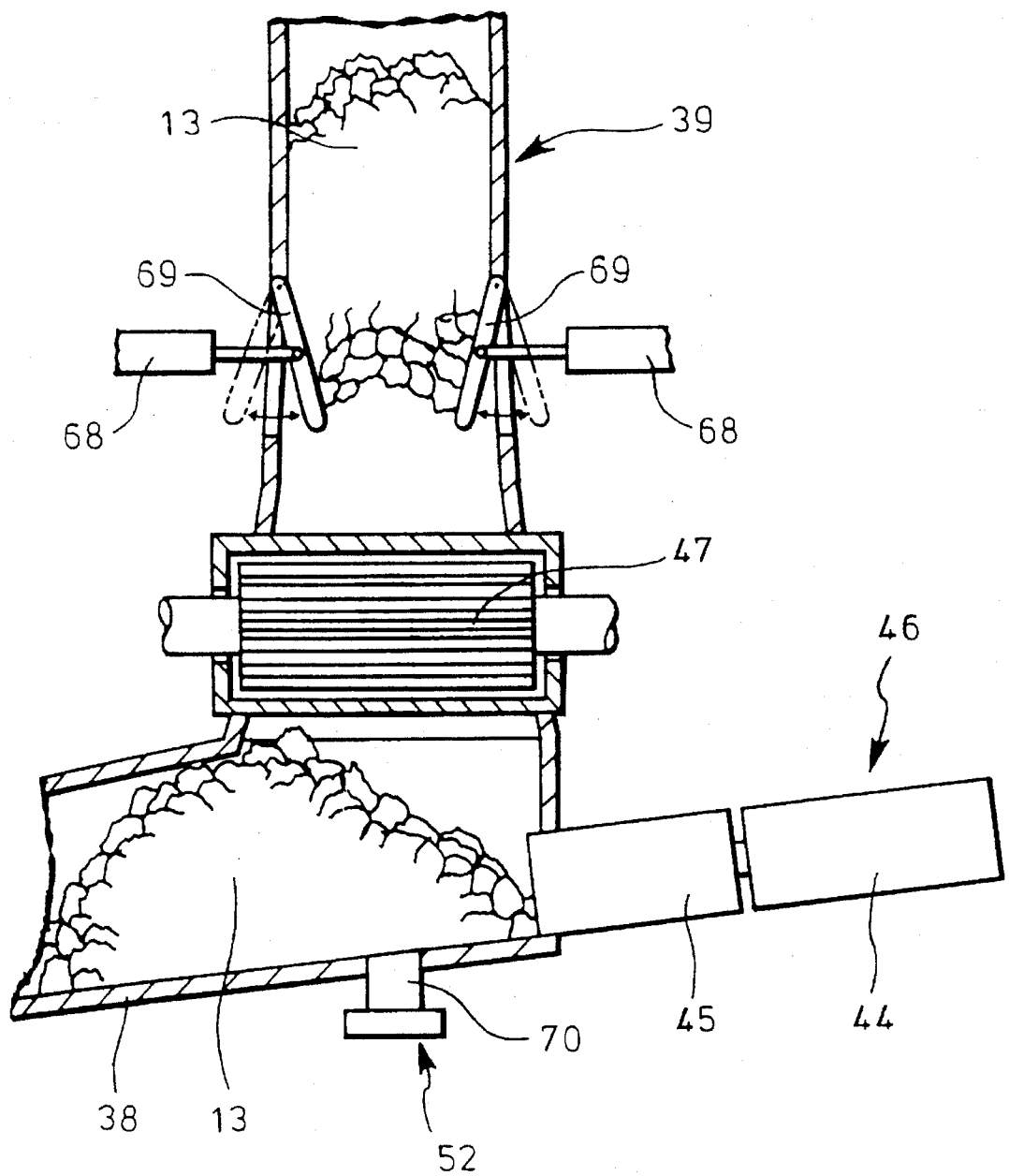
FIG. 18 is a side view in section of a still further example of bridging preventive device.

The still further variation shown in FIG. 18 has pivotal means 69 in the form of plates or rods pivotable into and out of the heat exchanger section 39 by means of cylinders 68. A bridging detector 52 is constituted by a load cell 70 which is disposed just below the heat exchanger section 39 and which detects the quantity of the scrap material 13 in the throat section 38 so as to detect any bridging.

It is to be understood that the present invention is not limited to the above-described embodiments and that various modifications may be made without departing from the true spirit of the present invention. For example, the present invention may be applied not only DC arc furnaces but also AC are furnaces and non-electrode type melting furnaces.

INDUSTRIAL APPLICABILITY

In an apparatus for preheating and charging scrap material into a furnace shell, scrap material is preheated at high heat exchange efficiency by high-temperature exhaust gases from a furnace shell and movable parts are prevented from being directly exposed to the high-temperature exhaust gases, resulting in advantages in thermal effect and in strength. The present invention is suitable for substantially continuous charging of preheated scrap material.

We claim:

1. An apparatus for preheating and charging scrap material, which includes:

a throat section having at one end thereof a material charging inlet connected to a furnace shell charging opening so as to drop and supply the scrap material into a furnace space, said throat section extending upwardly and obliquely from said charging opening and further having a material cutout device provided between said throat section and said charging inlet, a heat exchanger section connected to an upper end of said throat section and extending substantially vertically and upwardly, a sealing section located above said heat exchanger section, material supply means supplying the scrap material into said sealing section, an exhaust duct connected to a portion of said heat exchanger section immediately below said sealing section and connected to an exhaust system and cutout pusher means disposed at the upper end of said throat section for delivering the scrap material to said material cutout device.

2. An apparatus according to claim 1, wherein an angle of inclination of said throat section is between 3 and 25 degrees, said cutout pusher means having a height which is at most ½ that of said throat section and having a stroke of movement greater than a width dimension of said heat exchanger section.

3. An apparatus according to claim 1 or 2, wherein an upper portion of said heat exchanger section extends laterally and upwardly obliquely to define an additional throat section over which an additional heat exchanger section is provided, thereby providing a plurality of heat exchanger sections, and each of said throat sections includes cutout pusher means.

4. An apparatus according to claim 3, wherein said material cutout device comprises a material receiving stand receiving the scrap material from said cutout pusher means and a pushing device pushing out the scrap material over said receiving stand into said material charging inlet and a rod-like material guide extending above said receiving stand and parallel therewith.

5. An apparatus according to claim 4, wherein said guide is mounted so as to be vertically controllable.

6. An apparatus according to claim 5, wherein said guide comprises a rotating roller.

7. An apparatus according to claim 4, which comprises weighing means wherein said material receiving stand is supported by weighing means.

8. An apparatus according to claim 1 or 2, wherein said material cutout device comprises a material receiving stand receiving the scrap material from said cutout pusher means, a pushing device pushing out the scrap material over said receiving stand into said material charging inlet and a rod-like material guide extending above said receiving stand and parallel therewith.

9. An apparatus according to claim 8, wherein said guide is mounted so as to be vertically controllable.

10. An apparatus according to claim 9, wherein said guide comprises a rotating roller.

11. An apparatus according to claim 8, which comprises weighing means wherein said material receiving stand is supported by said weighing means.

12. An apparatus for preheating and charging scrap material, which comprises:

a throat section having at one end thereof a material charging inlet connected to a furnace shell charging opening so as to drop and supply the scrap material into a furnace space, said throat section extending upwardly and obliquely from said charging opening and further having a material cutout device provided between said throat section and said charging inlet, a heat exchanger connected to an upper end of said throat section and extending substantially vertically and upwardly, a sealing section located above said heat exchanger section, a material supply supplying the scrap material into said sealing section, an exhaust duct connected to a portion of said heat exchanger section immediately below said sealing section and connected to an exhaust system, and a cutout pusher disposed at the upper end of said throat section and delivering the scrap material to said material cutout device.

13. An apparatus according to claim 12, wherein an angle of inclination of said throat section is between 3° and 25°, said cutout pusher having a height which is at most ½ that of said throat section and having a stroke of movement greater than a width dimension of said heat exchanger section.

14. An apparatus according to claims 12 or 13, wherein an upper portion of said heat exchanger section extends laterally and upwardly obliquely to define an additional throat section over which an additional heat exchanger section is provided, thereby providing a plurality of heat exchanger sections, and each of said throat sections includes a cutout pusher.

15. An apparatus according to claim 14, wherein said material cutout device comprises a material receiving stand receiving the scrap metal from said cutout pusher, and a pushing device pushing out the scrap material over said receiving stand into said material charging inlet and a rod-like material guide extending above said receiving stand and in parallel therewith.

16. An apparatus according to claim 15, wherein said guide is mounted so as to be vertically controllable.

17. An apparatus according to claim 16, wherein said guide comprises a rotating roller.

18. An apparatus according to claim 15, which comprises a weighing mechanism wherein said material receiving stand is supported by said weighing mechanism.

19. An apparatus according to claim 12 or 13, wherein said material cutout device comprises a material receiving stand receiving the scrap material from said cutout pusher and a pushing device pushing out the scrap material over said receiving stand into said material charging inlet and a rod-like material guide extending above said receiving stand and in parallel therewith.

20. An apparatus according to claim 19, wherein said guide is mounted so as to be vertically controllable.

21. An apparatus according to claim 20, wherein said guide comprises a rotating roller.

22. An apparatus according to claim 19, which comprises a weighing mechanism wherein said material receiving stand is supported by said weighing mechanism.

* * * * *

UNITED STATES PATENT AND TRADEMARK OFFICE
CERTIFICATE OF CORRECTION

PATENT NO. : 5,513,206
DATED : April 30, 1996
INVENTOR(S) : Motoharu MORI et al

It is certified that error appears in the above-indentified patent and that said Letters Patent is hereby corrected as shown below:

COLUMN 12:
Claim 15, line 3, change "metal" to --material--.

Signed and Sealed this

First Day of October, 1996

Attest:

BRUCE LEHMAN

Attesting Officer    Commissioner of Patents and Trademarks